H. W. NEAL.
Wheel Plow.
No 78,390.
Patented May 26, 1868.
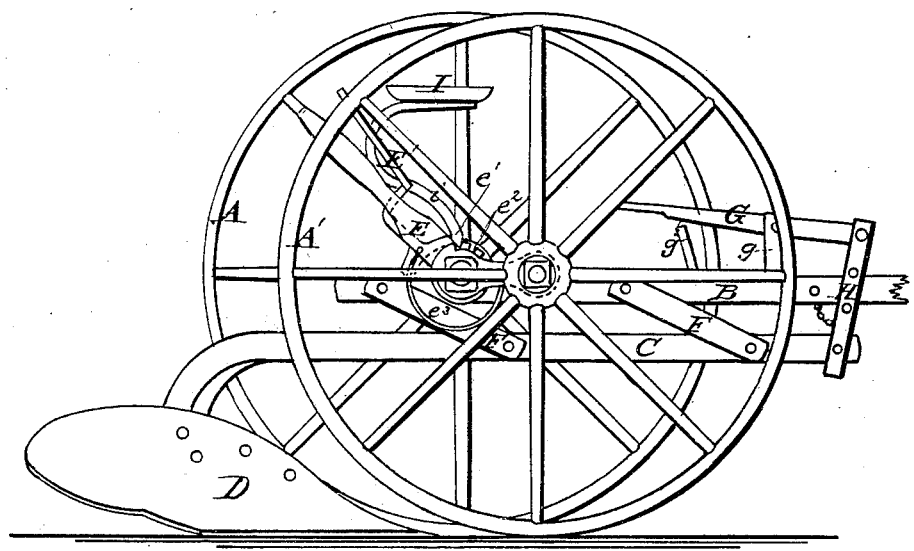
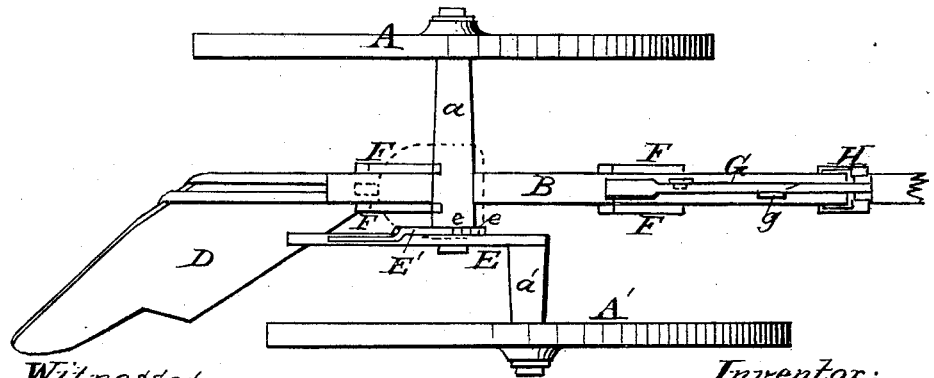

UNITED STATES PATENT OFFICE.

H. WALKER NEAL, OF SIDNEY, OHIO.

IMPROVEMENT IN PLOWS.

Specification forming part of Letters Patent No. 78,390, dated May 26, 1868.

*To all whom it may concern:*

Be it known that I, H. WALKER NEAL, of Sidney, in the county of Shelby and State of Ohio, have invented certain new and useful Improvements in Plows; and I do hereby declare that the following is a full, clear, and exact description thereof, reference being had to the accompanying drawings, and to the letters of reference marked thereon, which form a part of this specification, in which—

Figure 1 represents a side elevation of my improved plow, and Fig. 2 a plan or top view of the same.

The object of my invention is to provide a means for raising and lowering one of the wheels of a plow for the purpose of adapting it to working on side hills or the ridge of a furrow, and also an arrangement for holding the plow-beam and raising and lowering the same; and to these ends my improvement consists, first, in mounting one of the wheels of a plow upon a supplementary axle attached to a lever pivoted upon the main axle and provided with proper devices for holding it in position; second, in connecting the tongue and plow-beam by links of equal length, arranged in pairs, and raising and lowering the plow-beam by a lever pivoted to the tongue and connected to a clevis attached to the plow-beam.

In the accompanying drawings, B represents the tongue of the plow, to which the main axle $a$, which carries the wheel A, is secured. The wheel A' is mounted upon a supplementary axle, $a'$, secured firmly to the forward end of a bent unequal-armed lever, E, which is pivoted upon the main axle $a$, and by acting upon the rear end of which it is raised and lowered. A lever, E', is pivoted to the lever E in the rear of the main axle, having a catch, $e'$, upon its lower end, which engages in notches in a flange, $e^2$, upon the main axle, and is held in position by a spring, $e^3$.

The share D is attached to the plow-beam C by the links F F, which are of equal length, and pivoted in pairs to the tongue and plow-beam on each side thereof. By this arrangement the parallelism of the tongue and plow-beam is maintained when the latter is raised or lowered.

A lever, G, is pivoted near its center to the standard $g$ on top of the tongue, and at its forward end to the top of the clevis H, which embraces the tongue, and is pivoted at its lower end to the front of the plow-beam C. The lever G is held in position by the catch $g'$ when the plow-beam is raised, and the depth to which the latter is lowered can be regulated by inserting a pin in holes in the clevis H.

The wheel A' can be raised or lowered, as desired, by moving the lever E, upon the rear end of which a handle is formed, and the plow can be raised or lowered by the lever G, the depth of plowing being regulated by means of a pin in clevis H, while, from the manner of its suspension, the share can readily free itself from stones or other obstructions by jumping over them.

What I claim, and desire to secure by Letters Patent, is—

1. The lever E, pivoted upon the main axle, as set forth, for raising and lowering the wheel A'.

2. The combination of the levers E and E', notched flange $e^2$, and spring $e^3$, for the purpose of holding the wheel A' in desired position.

3. The combination of the tongue B, lever G, clevis H, and plow-beam C, arranged and operating as and for the purpose set forth.

In testimony that I claim the foregoing as my own I affix my signature in presence of two witnesses.

H. WALKER NEAL.

Witnesses:
H. C. ROBERTS,
T. F. WILKINSON.